Patented Dec. 7, 1943

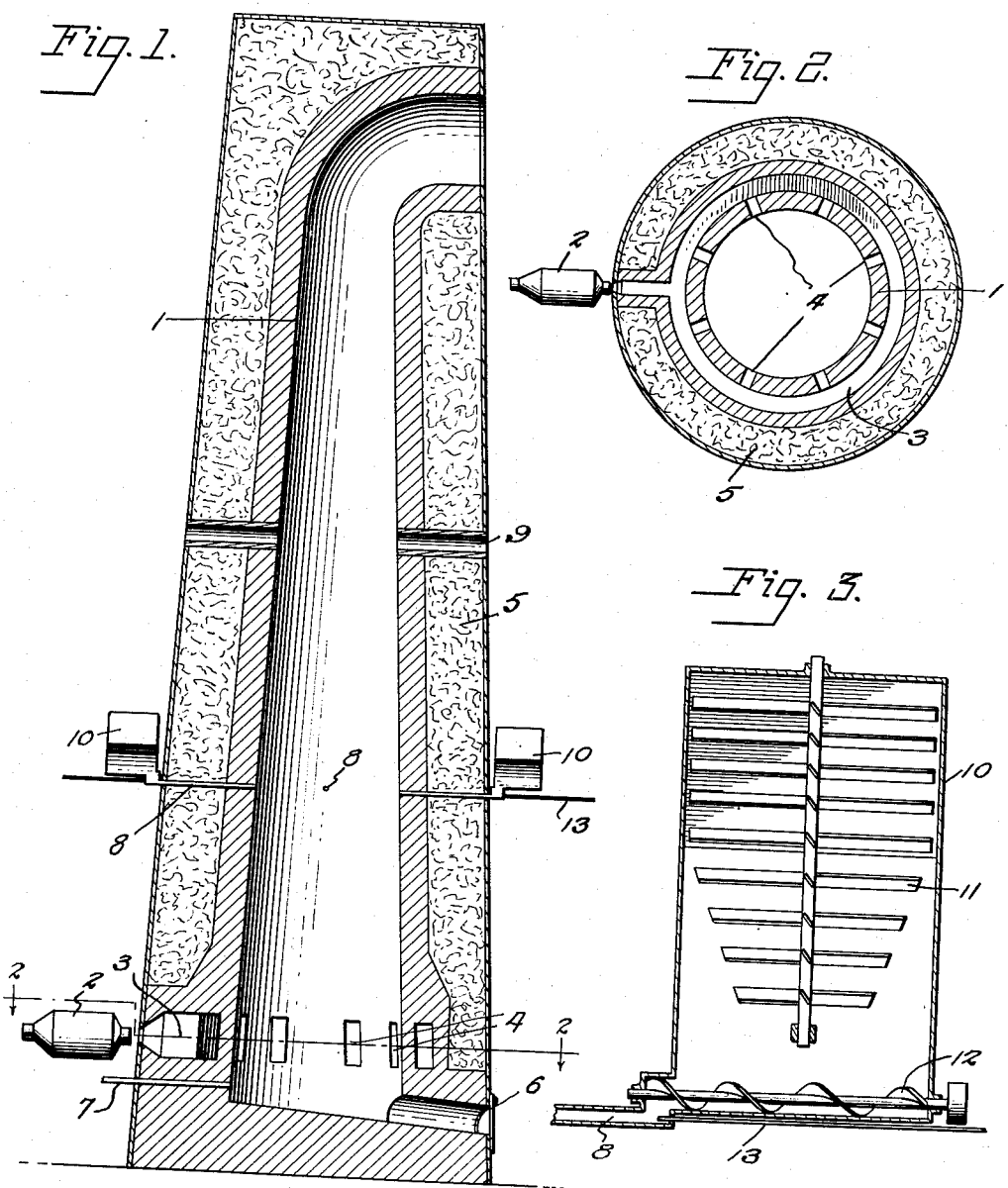

UNITED STATES PATENT OFFICE 2,336,180

MANUFACTURE OF SODIUM OR POTASSIUM SULPHATE AND HYDROGEN CHLORIDE

Alfred Lippman, Jr., and Rock L. Comstock, Weeks, La., assignors to Bay Chemical Company, Inc., New Orleans, La., a corporation of Louisiana Application June 12, 1940, Serial No. 340,112

9 Claims. (Cl. 23—121)

This invention relates to improvements in producing hydrochloric acid by heating sodium chloride, or potassium chloride, in a furnace. This involves the so-called Hargreaves process of producing hydrochloric acid. The process yields also sodium sulphate, or potassium sulphate, as the case may be. In the requisite chemical reactions, the chloride reacts with sulphur dioxide, air and moisture, according to the general expression:

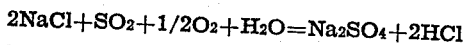

$$2NaCl + SO_2 + 1/2O_2 + H_2O = Na_2SO_4 + 2HCl$$

The Hargreaves process has been utilized commercially by passing gas containing originally sulphur dioxide, air and water vapor through a series of chambers in which are lumps or briquettes of salt. The gas passing through the chambers gradually changes in composition until finally hydrogen chloride is its essential valuable component. After the salt in a given chamber has been converted into sulphate, that chamber is disconnected from the series, cooled, refilled and again introduced into the system.

Considerable labor and equipment is required to produce the briquettes and to place them in the chambers and to re-load the chambers. Moreover, heat losses are tremendous, both from cooling of the chambers intermittently and from removal of hot sulphate. Hargreaves plants must operate continuously or else face exceedingly high costs of production. They possess little flexibility of operations to suit market demand.

Furthermore, since the reaction is exothermic, heat tends to accumulate in briquettes or lumps undergoing reaction. Accumulation of excessive heat would fuse the reacting area and so obstruct penetration of reagent gas and result in incomplete conversion. This presents a serious limitation to the speed of reaction and capacity of the process in operation.

Other modes of utilizing this fundamental reaction have been proposed. Thus, for example, it has been proposed to vaporize sodium chloride, but this has not been practical. Vaporization of salt requires a temperature of 2575° F. and ordinarily requires even higher temperatures in the furnace. Such high temperature augments corrosion of equipment. The high temperature has been sought by dropping salt upon a hot bed of fuel, but maintenance of draft is difficult because the salt melts and impedes flow of air through the combustion surfaces. Hence, exceptionally high drafts are required. Moreover, there is a tendency to contaminate products with smoke or soot, and also the combustion gases dilute the reaction gases.

Also it has been proposed to admix solid salt with substances that give off oxides of sulphur when heated, but the molten chloride and the pasty sulphate tend to impede combustion. Here too, the hot salts are exceedingly corrosive of equipment.

In all of these proposals, difficulties in operation, corrosiveness of the materials at high temperatures and inefficient heat balances constitute serious detriments to use of this Hargreaves furnace process of producing hydrogen chloride.

This invention is concerned with improvements of process and with improvements of appratus to avoid these difficulties. The accompanying drawing illustrates a preferred form of apparatus embodying the present invention. The appended claims particularly point out novel features of these improvements in apparatus and in process. The following description is illustrative of the principles of this invention but not restrictive thereof inasmuch as other forms likewise are useful within the terms of the appended claims. This description refers for example to sodium chloride, but it will be understood that the invention may be practiced as well with other suitable chlorides, particularly with potassium chloride, and that in the description and claims sodium chloride is representative of other chlorides.

In the drawing:

Figure 1 shows diagrammatically in vertical cross section a combination of furnace and parts developed to produce hydrogen chloride in accordance with the present invention;

Figure 2 shows the acid furnace in horizontal cross section along the line 2—2 of Figure 1;

Figure 3 shows means to feed salt into the reaction furnace.

Important practical advantages of this invention are attained by introducing into heated reagent gases powdered particles of sodium chloride. Preferably, chloride dust is expelled into a current of hot sulphur dioxide gas containing air and water vapor. Reaction proceeds quickly and completely. Hydrogen chloride is produced and flows along with the current of reagent gas while also a resulting stream of sodium sulphate particles in finely divided condition flows along with the gases. However, the sodium chloride particles may be introduced countercurrently into the stream of reagent gases with arrangements for the resulting sodium sulphate particles to fall to any predetermined extent by gravity.

Advantages of this preferred execution of the invention will be apparent by more specific reference to the apparatus illustrated in the drawing.

In Figure 1 is shown a tower or stack 1 communicating at its base with a sulphur burner 2. An annular duct 3 is arranged at the base of tower 1, from which ports 4 arranged circumferentially communicate with the tower. Thus gas may be distributed from sulphur burner 2 into the base of the furnace. The entire tower above the base is surrounded by heavy insulation 5. At the base of the tower below the ports is a passageway 6 that may be used to remove solid material such as salts deposited on the bottom of the furnace. Into this lower portion also is an inlet tube 7 connected to a suitable source.

At an intermediate portion of the tower, a circumferential series of pipe inlets 8 is provided for injection of finely divided salt. Inlets 9 for air arranged in the tower above salt inlets 8 simply communicate with the exterior of tower 1, but permit influx of air into the draft through the tower.

Sulphur or sulphide may be burned in well known manner in sulphur burners so as to yield a stream of sulphur dioxide gas. This sulphur dioxide gas enters the base of the furnace through ports 4 and is augmented by steam injected through inlet 7. The sulphur dioxide may be regulated to contain excess oxygen. This stream of gases rises through tower 1 to be exhausted by suitable means at the top of the tower. Into the flowing gases is injected a cloud of powdered salt from a circle of inlets 8 at an intermediate portion of the tower above the gas ports.

These inlets 8 are connected with a suitable supply of salt and with suitable mechanism for introducing salt particles into the furnace. Such mechanism, for example, may include an inlet for air under pressure to act as an injector.

Thus, for introduction of salt, inlet ports 8 are fed from a hopper 10 by gas injection. In hopper 10 may be suitable agitating means 11 and conveying means 12. A line 13 for compressed air opens into the salt conduit 8 so as to blow the salt particles into the tower. Instead of compressed air, hot gases may serve to inject the salt. It will be observed that the intermediate salt inlets 8 are arranged so that a stream from one will meet the stream from another opening and from the resulting turbulence tend to cause a cloud of fine particles in the interior of the furnace shaft, and to minimize impingement of the particles against the walls of the retort. Thus is provided an intimate intermixture of the stream of sulphur dioxide gas, oxygen and moisture with the cloud of powdered salt. These reagents all are at elevated temperatures and possess extensive surfaces for reaction. Reaction ensues quickly.

The salt may be introduced as a dispersion by other means than the injectors described above; for instance, mechanical introduction by gravity, with dispersion by passing over baffles; devices, as car-loaders, to impart to the salt high linear velocity; rotating blades or plates to whip the salt into the furnace; screening the salt into the top of the furnace, etc.

Particles of sodium sulphate that result from reaction in the tower tend to remain finely divided as they rise with the stream of resulting hydrogen chloride and intermixed sulphurous gases. The cloud of products evolved from the top of the furnace comprises essentially sodium sulphate, hydrogen chloride, nitrogen, residual oxygen and water vapor with small amounts of sulphur dioxide, sulphur trioxide and unconverted salt. Removal of the sodium sulphate from these gases may be accomplished in various ways. First, the gases from the furnace may be cooled. Then the sulphate may be removed by electrical precipitation or otherwise. Some sodium sulphate may cool on apparatus walls so as to require some shaking or scraping device to remove it in order to maintain efficiency of heat transfer and to recover the sulphate. To minimize deposition of sulphate on walls of cooling equipment, cool air or cooled exit gases may be intermixed with the gas issuing from the furnace in proportions to reduce the temperature to 400 to 700° F. This is a temperature at which sulphate particles do not tend to adhere to walls. Moreover, it is a temperature suitable for electric precipitation of the solid particles. Thus this temperature range permits sulphate to be removed as a dry powder. At higher temperatures more severe corrosion of the equipment would result and at lower temperatures sulphuric acid or hydrochloric acid would condense and yield an extremely corrosive product. Instead of electric precipitation, settling chambers or centrifuges or filter systems may be used to separate sulphate from the gases.

The gases cleaned of sulphate contain essentially hydrogen chloride as a valuable ingredient and may be used for the manufacture of muriatic acid. Should any salts fall to the bottom of the furnace they may be removed from passage 6. Ordinarily, however, the passage 6 is kept closed.

As a suitable example of this procedure, sulphur may be burnt at the rate of 78 pounds per hour to yield 10% $SO_2$ gas. Steam at the rate of fifty pounds per hour is injected through inlet 7. Salt may be injected through inlets 8 at a point about 12 feet above the furnace floor at the rate of 290 pounds per hour. From these reagents are produced in a 30 foot vertical retort three feet in diameter, illustrated in Figure 1, about 350 pounds of sodium sulphate 98.7% pure, or about four tons a day.

Temperature of about 1500° F. in the furnace shaft before injection of salt would be suitable and that temperature may be maintained substantially throughout the reaction. Salt may be introduced by injector action with air under pressure up to about 10 inches of mercury. This air facilitates dispersion of the salt cloud in the gaseous reagents. Small particle size of the salt is an important factor in efficient operation of this process. As illustrative of suitable fineness, the salt may show a screen analysis of:

| | Per cent |
|---|---|
| On 80 mesh | 10 |
| On 100 mesh | 27 |
| On 200 mesh | 28 |
| On 325 mesh | 20 |
| Through 325 mesh | 15 |

Standard No. 325 sieve contains particle openings of about 44 microns.

It is desirable for acceleration of the reaction to introduce catalyst into the salt. For this purpose the sodium chloride may be treated with a solution of iron chloride to contain up to 1% equivalent $Fe_2O_3$, preferably about 0.50%. In consequence, the reaction proceeds satisfactorily at about 1480° F. When the catalyst is eliminated, temperature required for complete reaction in the equipment described therein is 1550° F. or more.

Reaction may be accelerated further by providing sulphur dioxide gas approaching 14% concentration. A more dilute $SO_2$ gas is lower in temperature and may fail to promote reaction without assistance of outside heat. Where sulphur is burned in air, 14% is the practical maximum content of $SO_2$ since about 7% oxygen from the original 21% oxygen content of air is required to form the sodium sulphate equivalent to hydrogen chloride produced in this process. With 12% or 13% SO₂, the requisite temperature of 1480° F. or more may be attained readily in a well insulated retort.

Further, this reaction may be accelerated by increasing the percentage of SO₂ inlet gases to 15% or more. Then requisite oxygen to complete the reaction may be introduced as an auxiliary stream from inlets 9 higher in the furnace. In this way the inlet gases may well attain a temperature of 2000° F. or more. This modification, however, is not resorted to unless required by the size of salt particles inasmuch as extremely high temperatures are avoided.

The reaction may be accelerated also by elevating the temperature of the incoming SO₂ gases through preheating the air introduced into the sulphur burner or through insulating the sulphur burner or providing the sulphur burner internally with longitudinal fins. To facilitate insulation, the furnace may be placed below ground. Not only may auxiliary heat be introduced from the sulphur burner, but prior to injection the salt may be preheated to about 200 to 500° F. Air used to inject the salt may serve for such preheating; in that case the salt injection conduit 8 is sufficient for adequate heating of the salt. This air may be preheated readily by heat interchange with the outgoing gases from the furnace.

Incoming salt may be preheated by direct contact with exit gases from the tower either before or after removal of sulphate. If sulphate has been removed so the temperature has been lowered, care must be taken to avoid condensing hydrochloric acid, since hydrochloric acid in the salt would corrode the salt injecting apparatus.

In the process described, flow of reagents is concurrent for a considerable portion of their travel, though salt particularly the heavier particles, may move countercurrently to reagent gas for some distance above the gas inlet. However, it is undesirable to introduce both salt and sulphur oxide gases at the bottom of the tower because considerable salt would deposit on the floor of the tower before reacting. It is undesirable to introduce salt particles and the sulphurous gases both too near the top of the furnace for this may result in drawing the smaller salt particles out of the shaft without time for reaction. Introduction of salt at some distance above the bottom of the tower with sulphur oxide entering near the bottom of the tower provides a preferred combination.

Moreover, a downward concurrent flow of salt particles and sulphur oxide gases, with removal of products at a bottom outlet, lacks the advantage of countercurrent flow through a portion of the reaction zone.

In lieu of a vertical furnace, suitable apparatus may comprise a horizontal insulated furnace, but for the horizontal furnace the salt particles must be injected with considerable velocity, sufficient to maintain suspension of the salt particles until reaction is completed. This requires greater pressure of injection than is required for a vertical unit. It will be understood that maintenance of suspension of the powdered reagent is promoted not only by fineness of particle size and by the impingement of salt from one jet against another jet, but promoted also by the turbulence that accompanies flow of air from the injection nozzle and also by suitable direction of the inflowing, injected streams of solid reagent.

While in accordance with the patent statutes we have described a preferred embodiment of the present invention, it will now be apparent to those skilled in the art that modifications and alterations may be made within the scope of the appended claims.

What we claim is:

1. A process for the manufacture of alkali metal sulphate, which comprises dispersing crystalline particles of alkali metal chloride, maintained at a temperature substantially below reaction temperature immediately prior to dispersion, into a gaseous atmosphere of sulphur oxide, oxygen and water vapor at a reaction temperature of approximately 1450° F. to 2000° F.

2. A process for the manufacture of alkali metal sulphate, which comprises dispersing crystalline particles of alkali metal chloride, maintained at a temperature substantially below reaction temperature immediately prior to dispersion, into a gaseous atmosphere of sulphur oxide, oxygen and water vapor at a reaction temperature of approximately 1450° F. to 2000° F., whereby to produce solid particles and gaseous reaction products, cooling the reaction product and separating therefrom the last mentioned solid particles.

3. A process in accordance with claim 1, in which the alkali metal chloride contains approximately 0.5% iron oxide.

4. A process in accordance with claim 1, in which the reaction temperature is approximately 1450° F. to 1550° F.

5. A process for the manufacture of sodium sulphate and hydrogen chloride, which comprises dispersing crystalline particles of salt, maintained at a temperature substantially below reaction temperature immediately prior to dispersion, into a gaseous atmosphere of sulphur oxide, oxygen and water vapor at a reaction temperature of approximately 1450° F. to 2000° F.

6. A process in accordance with claim 5, in which the reaction temperature is approximately 1450° F. to 1550° F.

7. A process in accordance with claim 5, in which the sulphur oxide is sulphur dioxide.

8. A process in accordance with claim 5, in which the sulphur oxide is sulphur dioxide, and the amount of sulphur dioxide is approximately 10% to 14% by volume of the gaseous atmosphere.

9. A process for the manufacture of alkali metal sulphate, comprising reacting crystalline particles of alkali metal chloride maintained at a temperature substantially below reaction temperature immediately prior to dispersion in reaction gases, by dispersing said particles into a moving stream of gases containing sulphur oxide, oxygen and water vapor at a reaction temperature of approximately 1450° F. to 2000 F. whereby to produce alkali metal sulphate particles of a fine state of division, which remain substantially suspended in the moving stream of gas, cooling the gas ond separating therefrom the alkali metal sulphate particles.

ALFRED LIPPMAN, Jr.
ROCK L. COMSTOCK.